April 24, 1962 A. I. ZAGAR 3,030,818
POSITIVE DRIVE TAPPING ATTACHMENTS
Filed Nov. 17, 1958
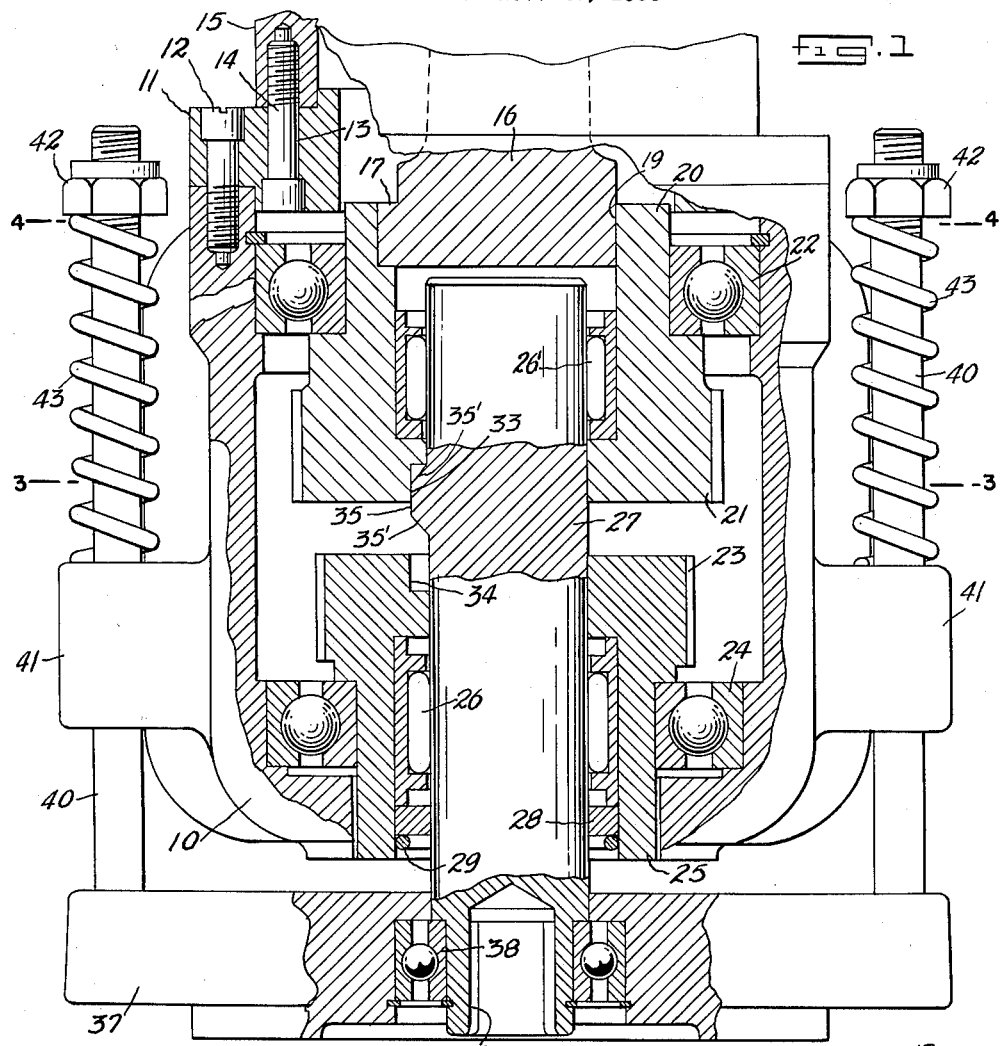
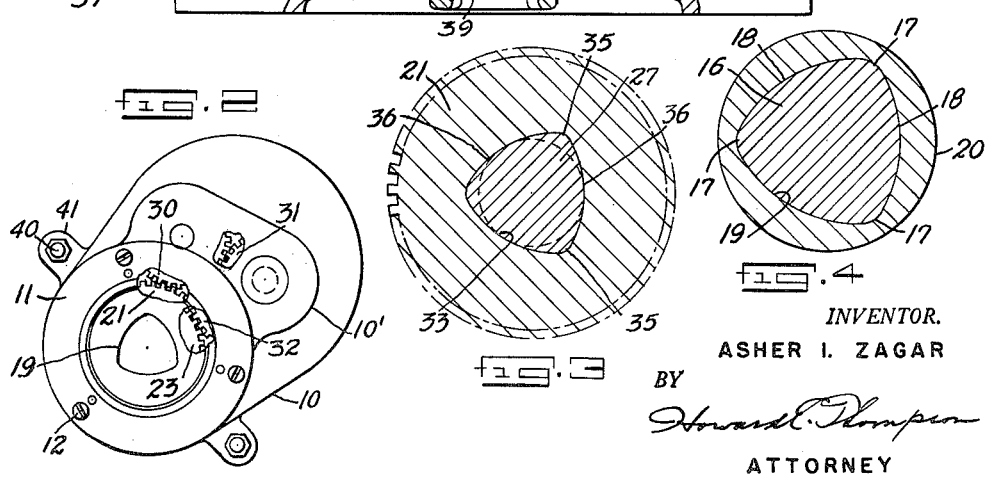
INVENTOR.
ASHER I. ZAGAR
BY
Howard E. Thompson
ATTORNEY United States Patent Office 3,030,818
Patented Apr. 24, 1962

3,030,818
POSITIVE DRIVE TAPPING ATTACHMENTS
Asher I. Zagar, Brooklyn, N.Y., assignor to Ettco Tool & Machine Co., Inc., Brooklyn, N.Y., a corporation of New York
Filed Nov. 17, 1958, Ser. No. 774,281
2 Claims. (Cl. 74—377)

This invention relates to tapping attachments employing a positive drive of the forward and reverse gears in establishing forward and reverse drives of the attachment. More particularly, the invention deals with a device of this kind, wherein a polygon-type of positive clutch drive is established between the forward and reverse drive gears of the attachment and, wherein, a quill gearing is employed in transmitting the drive of the forward drive gear to the reverse drive gear of the attachment.

Still more particularly, the invention deals with an attachment of the character described, wherein a polygon-type of key coupling is provided between the drive spindle and the forward drive gear of the attachment.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a side and broken sectional view through an attachment made according to my invention, with parts of the construction shown in elevation.

FIG. 2 is a diagrammatic plan view of the attachment, with the supporting bracket and drive spindle removed and with parts of the construction broken away to diagrammatically illustrate the quill gearing drive of the attachment.

FIG. 3 is a partial section on the line 3—3 of FIG. 1; and

FIG. 4 is a partial section on the line 4—4 of FIG. 1.

In practice, I provide a casing 10 of the irregular contour diagrammatically illustrated in FIG. 2 of the drawing and including an extension 10′, in which portions of the quill gearing are arranged. The upper end of the casing is open and arranged therein is a ring-like closure 11 secured in position by screws 12. The closure 11 includes circumferentially spaced apertures 13, in which are supported coupling screws 14 for mounting a supporting bracket, indicated, in part, at 15 in FIG. 1 of the drawing.

Arranged within the bracket 15 is the drive spindle 16 of a suitable machine for actuating the attachment. The spindle 16 has a clutch head of substantially polygon cross-sectional form, as indicated by the offset key portions 17. Note, in this connection, FIG. 4 of the drawing. The key portions 17 are preferably rounded and are joined by rounded surfaces, as indicated at 18.

The clutch head of the spindle 16 is adapted to seat in a correspondingly formed polygon socket 19 in the upper sleeve portion 20 of a forward drive gear 21 supported in a suitable ball bearing 22 in the casing. At 23 is shown the reverse drive gear which is supported in a suitable bearing 24 in the lower portion of the casing, the gear 23 having an extending sleeve portion 25, in which is supported a roller bearing 26, in which the driven shaft 27 is mounted. At 28 is shown a packing supported in the sleeve by a spring ring 29.

A quill gearing for transmitting the drive of the forward gear 21 to the gear 23 is employed and this is illustrated, in part, in FIG. 2 of the drawing, from which it will be noted that an idler gear 30 meshes with the gear 21, the idler driving a gear 31 on the quill gearing, the gear 31 being an upper gear and at 32 is shown a lower quill gear which meshes with the reverse drive gear 23. This type of gearing is generally known in the art and, for this reason, no detailed showing thereof is deemed to be necessary and no attempt is made to illustrate the gears 30, 31 and 32 in the background of FIG. 1, thus simplifying the illustration in FIG. 1. In this connection, a type of quill gearing is illustrated, for example, in United States Patent Number 2,231,465, dated February 11, 1941.

It will also be noted that a roller bearing 26′, similar to the bearing 26, is arranged in the gear 21 and provides an upper bearing support for the driven shaft 27. The gear 21, as well as the gear 23, have polygon key sockets 33 and 34, respectively, with which a polygon clutch portion of the shaft 27 is adapted to operate, this clutch portion being defined by three rounded offset key portions 35, note FIG. 3, these portions being joined by rounded surfaces 36. It will be understood that the key sockets 33 and 34 will be of similar contour, the socket 33 being noted in FIG. 3 of the drawing.

Mounted on the protruding end of the shaft 27 is an adaptor head 37 supporting a bearing 38, in which the lower key socket portion 39 of the shaft 29 is free to rotate. The head 37 supports, at its ends, upwardly extending rods 40, which are supported in protruding lugs 41 on the casing 10 and adjustably supported on the rods 40 by means of a nut 42 on each rod are springs 43 which normally support the shaft 27 in clutching engagement with the gear 21 in establishing the forward drive of the attachment. However, in the reverse drive and when the attachment is moved upwardly, the downward pull exerted by the tool or tools on the shaft 27 will move the clutch members 35 into the socket 34 of the reverse drive gear 23 in reversing the drive of the tool for withdrawal of the tap or taps from a workpiece, as with other devices of this type and kind.

The gears 21 and 23, or the sleeve portions 20, 25 thereof, have a pressed fit in the bearings 22, 24, respectively, in maintaining position of the gears in the casing.

It will be noted from a consideration of FIG. 1 of the drawing that the members 35 have bevelled upper and lower surfaces, as indicated at 35′, which operate to guide the members 35 into the sockets 33 and 34. These bevels extend along the entire surface of the members 35 or, in other words, onto part of the rounded portions 36, which join the circumferentially spaced members 35. By reason of this construction, the overall dimensions of a tapping attachment of the kind under consideration can be materially reduced and, at the same time, a strong and durable key coupling is provided, not only between the drive spindle 16 and the forward drive gear 21, but between said gear and the reverse gear 23 and the driven spindle 27.

Having fully described my invention, what I claim as new and desire to secure by Letters Patent is:

1. A tapping attachment of the character described comprising a casing, forward and reverse drive gears including sleeve portions arranged in said casing, said gears having closely adjacent surfaces, ball bearings between the sleeve portion and casing for free rotation of the gears in the casing, the forward drive gear having a polygon socket in its sleeve portion for reception of a polygon key on a drive spindle extending into the casing and projecting through one end of the casing, both gears having within the adjacent surfaces thereof identical polygon key sockets, a driven spindle having a roller bearing mounting in each of said gears, said driven spindle having an end protruding outwardly beyond the other end of said casing, said driven spindle having an integral polygon clutch portion for operative engagement with the identical polygon sockets of said gears in forward and reverse drives of the attachment, the polygon clutch portion of said driven spindle comprising three circumferentially spaced rounded members, said members being joined by curved surfaces, said members having bevelled upper and lower surfaces for guidance of the members into the sockets of said gears, a quill gearing drive between the forward and reverse drive gears, and tensional means externally of the casing and operatively engaging said driven spindle for normal support of the polygon clutch of the driven spindle in engagement with the forward drive gear of the attachment.

2. An attachment as defined in claim 1, wherein said last named means comprises projecting lugs on opposed sides of the casing, an adaptor head on the protruding end of the driven spindle, said head having a pair of rods supported in said lugs, and springs engaging said lugs and adjustable means on said rods.

References Cited in the file of this patent

UNITED STATES PATENTS

| | | |
|---|---|---|
| 437,157 | Honeyman | Sept. 23, 1890 |
| 873,441 | Leonard | Dec. 10, 1907 |
| 1,424,501 | McIntosh | Aug. 1, 1922 |
| 1,915,542 | Lundin et al. | June 27, 1933 |